(12) United States Patent
Chambers

(10) Patent No.: US 6,790,324 B2
(45) Date of Patent: Sep. 14, 2004

(54) HYDROGEN PRODUCING APPARATUS

(75) Inventor: Stephen Barrie Chambers, Calgary (CA)

(73) Assignee: Xogen Power Inc., Calgary (CA)

(*) Notice: Subject to any disclaimer, the term of this patent is extended or adjusted under 35 U.S.C. 154(b) by 207 days.

(21) Appl. No.: 10/183,855

(22) Filed: Jun. 25, 2002

(65) Prior Publication Data

US 2002/0179453 A1 Dec. 5, 2002

Related U.S. Application Data

(63) Continuation of application No. 09/608,316, filed on Jun. 30, 2000, now Pat. No. 6,419,815, which is a continuation of application No. 09/105,023, filed on Jun. 26, 1998, now Pat. No. 6,126,794.

(51) Int. Cl.[7] ............................................. C25D 17/00
(52) U.S. Cl. ..................... 204/242; 204/267; 204/272; 204/278; 204/293; 204/278.5
(58) Field of Search .............................. 204/242, 267, 204/293, 278, 272, 278.1; 205/628–632

(56) References Cited

U.S. PATENT DOCUMENTS

| 3,311,097 A | | 3/1967 | Mittelstaedt | 123/119 |
|---|---|---|---|---|
| 3,954,592 A | * | 5/1976 | Horvath | 204/229.7 |
| 4,107,008 A | * | 8/1978 | Horvath | 205/339 |
| 4,184,931 A | | 1/1980 | Inoue | 204/129 |
| 4,316,787 A | | 2/1982 | Themy | 204/242 |
| 4,394,230 A | * | 7/1983 | Puharich | 205/341 |
| 4,599,158 A | | 7/1986 | Ofenloch | 204/228 |
| 4,798,661 A | | 1/1989 | Meyer | 204/228 |
| 5,338,421 A | * | 8/1994 | Abe et al. | 204/514 |
| 5,632,870 A | | 5/1997 | Kucherov | 204/241 |

FOREIGN PATENT DOCUMENTS

| JP | 9071886 | 3/1997 | ............ C25B/1/04 |
|---|---|---|---|
| RU | 2 048 609 C1 | 11/1995 | |
| WO | 9809001 | 3/1998 | ............ C25B/1/04 |

\* cited by examiner

Primary Examiner—Donald R. Valentine
(74) Attorney, Agent, or Firm—Stoel Rives LLP

(57) ABSTRACT

An apparatus for producing orthohydrogen and/or parahydrogen. The apparatus includes a container holding water and at least one pair of closely-spaced electrodes arranged within the container and submerged in the water. A first power supply provides a particular first pulsed signal to the electrodes. A coil may also be arranged within the container and submerged in the water if the production of parahydrogen is also required. A second power supply provides a second pulsed signal to the coil through a switch to apply energy to the water. When the second power supply is disconnected from the coil by the switch and only the electrodes receive a pulsed signal, then orthohydrogen can be produced. When the second power supply is connected to the coil and both the electrodes and coil receive pulsed signals, then the first and second pulsed signals can be controlled to produce parahydrogen. The container is self-pressurized and the water within the container requires no chemical catalyst to efficiently produce the orthohydrogen and/or parahydrogen. Heat is not generated, and bubbles do not form on the electrodes.

16 Claims, 10 Drawing Sheets

HYDROGEN PRODUCING APPARATUS

This application is a continuation of U.S. patent application Ser. No. 09/608,316, filed Jun. 30, 2000, now U.S. Pat. No. 6,419,815, which is a continuation of U.S. application Ser. No. 09/105,023, filed Jun. 26, 1998, now U.S. Pat. No. 6,126,794.

TECHNICAL FIELD

The present invention relates to methods for producing orthohydrogen and parahydrogen.

BACKGROUND OF THE INVENTION

Conventional electrolysis cells are capable of producing hydrogen and oxygen from water. These conventional cells generally include two electrodes arranged within the cell which apply energy to the water to thereby produce hydrogen and oxygen. The two electrodes are conventionally made of two different materials.

However, the hydrogen and oxygen generated in the conventional cells are generally produced in an inefficient manner. That is, a large amount of electrical power is required to be applied to the electrodes in order to produce the hydrogen and oxygen. Moreover, a chemical catalyst such as sodium hydroxide or potassium hydroxide must be added to the water to separate hydrogen or oxygen bubbles from the electrodes. Also, the produced gas must often be transported to a pressurized container for storage, because conventional cells produce the gases slowly. Also, conventional cells tend to heat up, creating a variety of problems, including boiling of the water. Also, conventional cells tend to form gas bubbles on the electrodes which act as electrical insulators and reduce the function of the cell.

Accordingly, it is extremely desirable to produce a large amount of hydrogen and oxygen with only a modest amount of input power. Furthermore, it is desirable to produce the hydrogen and oxygen with "regular" tap water and without any additional chemical catalyst, and to operate the cell without the need for an additional pump to pressurize it. It would also be desirable to construct the electrodes using the same material. Also, it is desirable to produce the gases quickly, and without heat, and without bubbles on the electrodes.

Orthohydrogen and parahydrogen are two different isomers of hydrogen. Orthohydrogen is that state of hydrogen molecules in which the spins of the two nuclei are parallel. Parahydrogen is that state of hydrogen molecules in which the spins of the two nuclei are antiparallel. The different characteristics of orthohydrogen and parahydrogen lead to different physical properties. For example, orthohydrogen is highly combustible whereas parahydrogen is a slower burning form of hydrogen. Thus, orthohydrogen and parahydrogen can be used for different applications. Conventional electrolytic cells make only orthohydrogen and parahydrogen. Parahydrogen, conventionally, is difficult and expensive to make.

Accordingly, it is desirable to produce cheaply orthohydrogen and/or parahydrogen using a cell and to be able to control the amount of either produced by the cell. It is also desirable to direct the produced orthohydrogen or parahydrogen to a coupled machine in order to provide a source of energy for the same.

SUMMARY OF THE INVENTION

It is therefore an object of the present invention to provide a cell having electrodes and containing water which produces a large amount of hydrogen and oxygen in a relatively small amount of time, and with a modest amount of input power, and without generating heat.

It is another object of the present invention for the cell to produce bubbles of hydrogen and oxygen which do not bunch around or on the electrodes.

It is also an object of the present invention for the cell to properly operate without a chemical catalyst. Thus, the cell can run merely on tap water. Moreover, the additional costs associated with the chemical catalyst can be avoided.

It is another object of the present invention for the cell to be self-pressurizing. Thus, no additional pump is needed.

It is another object of the present invention to provide a cell having electrodes made of the same material. This material can be stainless steel, for example. Thus, the construction of the cell can be simplified and corresponding costs reduced.

It is another object of the present invention to provide a cell which is capable of producing orthohydrogen, parahydrogen or a mixture thereof and can be controlled to produce any relative amount of orthohydrogen and parahydrogen desired by the user.

It is another object of the invention to couple the gaseous output of the cell to a device, such as an internal combustion engine, so that the device may be powered from the gas supplied thereto.

These and other objects, features, and characteristics of the present invention will be more apparent upon consideration of the following detailed description and appended claims with reference to the accompanying drawings, wherein like reference numerals designate corresponding parts in the various figures.

Accordingly, the present invention includes a container for holding water. At least one pair of closely-spaced electrodes are positioned within the container and submerged under the water. A first power supply provides a particular pulsed signal to the electrodes. A coil is also arranged in the container and submerged under the water. A second power supply provides a particular pulsed signal through a switch to the electrodes.

When only the electrodes receive a pulsed signal, then orthohydrogen can be produced. When both the electrodes and coil receive pulsed signals, then parahydrogen or a mixture of parahydrogen and orthohydrogen can be produced. The container is self pressurized and the water within the container requires no chemical catalyst to efficiently produce the orthohydrogen and/or parahydrogen.

DETAILED DESCRIPTION OF PREFERRED EMBODIMENT

Figure 1:
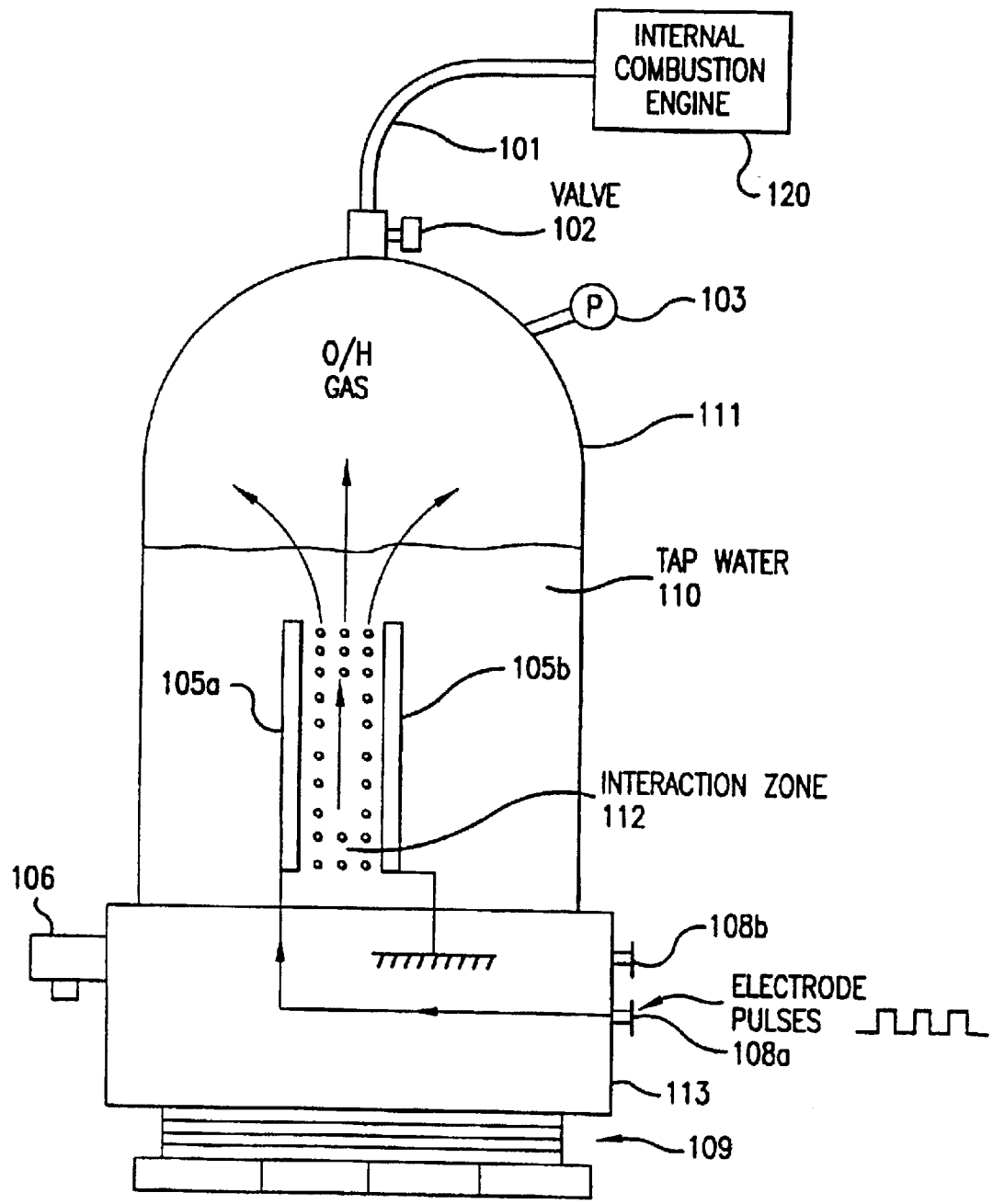
FIG. 1 is a side view of a cell for producing orthohydrogen including a pair of electrodes according to a first embodiment of the present invention.

FIG. 1 shows a first embodiment of the present invention including a cell for producing hydrogen and oxygen. As will be discussed below in conjunction with FIGS. 6–8, the production of parahydrogen requires an additional coil not shown in FIG. 1. Thus, the hydrogen produced by the first embodiment of FIG. 1 is orthohydrogen.

The cell includes a closed container 111 which is closed at its bottom portion by threaded plastic base 113 and screw thread base 109. The container 111 can be made of, for example, plexiglass and have an exemplary height of 43 cm and an exemplary width of 9 cm. The container 111 holds tap water 110 therein.

The cell further includes a pressure gauge 103 to measure the pressure within the container 111. An outlet valve 102 is connected to the top of the container 111 to permit any gas within the container 111 to escape into an output tube 101.

The cell also includes a pop valve 106 connected to a base 113. The pop valve 106 provides a safety function by automatically releasing the pressure within the container 111 if the pressure exceeds a predetermined threshold. For example, the pop valve 106 may be set so that it will open if the pressure in the container exceeds 75 p.s.i. Since the container 111 is built to withstand a pressure of about 200 p.s.i., the cell is provided with a large safety margin.

A pair of electrodes 105a, 105b are arranged within the container 111. The electrodes 105a, 105b are submerged under the top level of the water 110 and define an interaction zone 112 therebetween. The electrodes 105a, 105b are preferably made of the same material, such as stainless steel.

In order to produce an optimal amount of hydrogen and oxygen, an equal spacing between the electrodes 105a, 105b must be maintained. Moreover, it is preferable to minimize the spacing between the electrodes 105a, 105b. However, the spacing between the electrodes 105a, 105b cannot be positioned excessively close because arcing between the electrodes 105a, 105b would occur. It has been determined that a spacing of 1 mm is optimal spacing for producing hydrogen and oxygen. Spacing up to 5 mm can work effectively, but spacing above 5 mm has not worked well, except with excessive power.

Hydrogen and oxygen gas outputted through output tube 101 can be transmitted by tube 101 to a device 120 using those gases, for example an internal combustion engine, such as shown in FIG. 1. Instead of an internal combustion engine, device 120 may be any device using hydrogen and oxygen, including a reciprocating piston engine, a gas turbine engine, a stove, a heater, a furnace, a distillation unit, a water purification unit, a hydrogen/oxygen jet, or other device using the gases. With an adequately productive example of the present invention, any such device 120 using the output gases can be run continuously without the need for storing dangerous hydrogen and oxygen gases.

Figure 2:
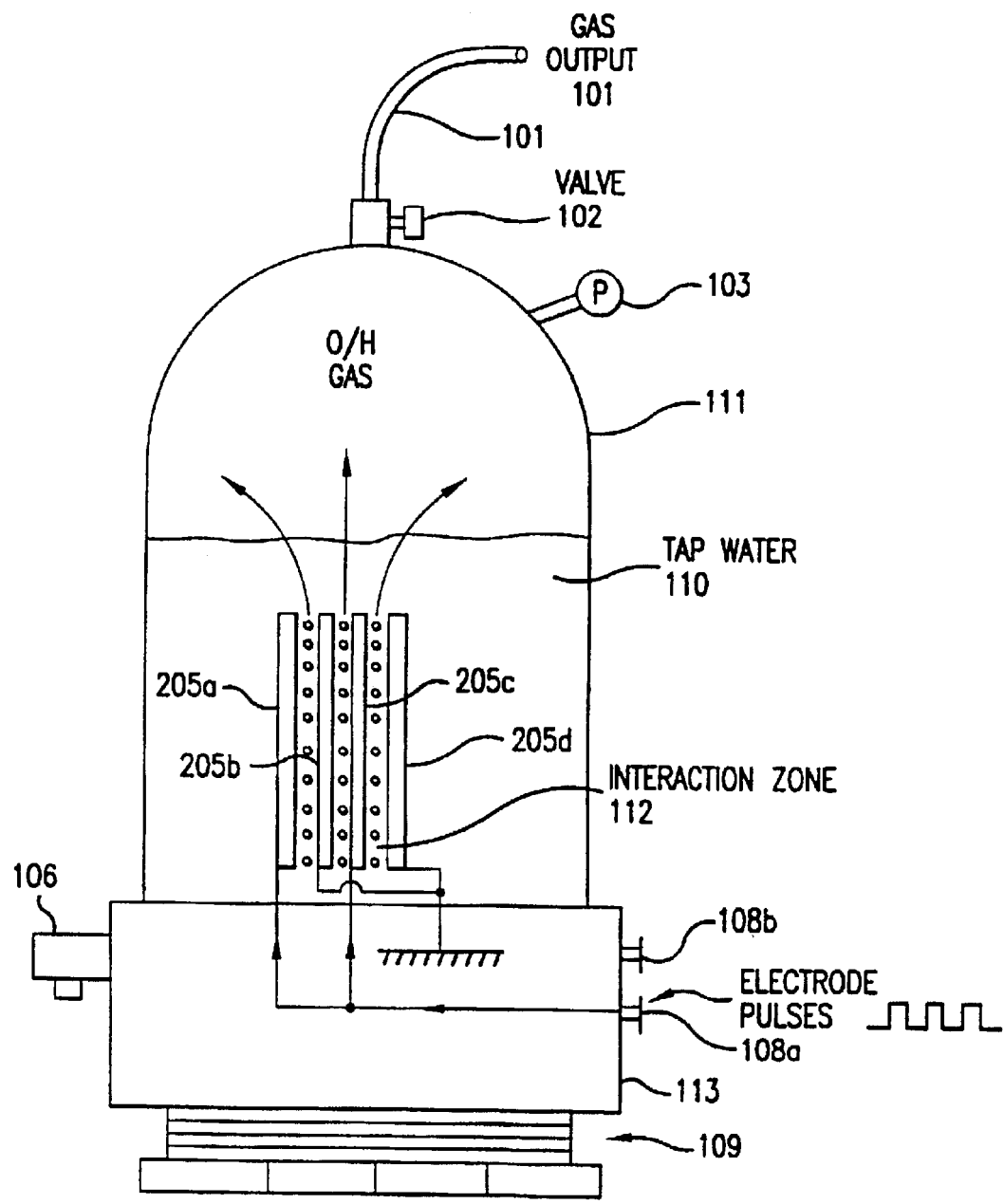
FIG. 2 is a side view of a cell for producing orthohydrogen including two pairs of electrodes according to a second embodiment of the present invention.

FIG. 2 shows a second embodiment of the present invention which includes more than one pair of electrodes 205a–d. The spacing between the electrodes is less than 5 mm as in the embodiment of FIG. 1. While FIG. 2 shows only one additional pair of electrodes, it is possible to include many more pairs (e.g., as many as 40 pairs of electrodes) within the cell. The rest of the cell illustrated in FIG. 2 remains the same as that illustrated in FIG. 1. The multiple electrodes are preferably flat plates closely spaced, parallel to each other.

Figure 3:
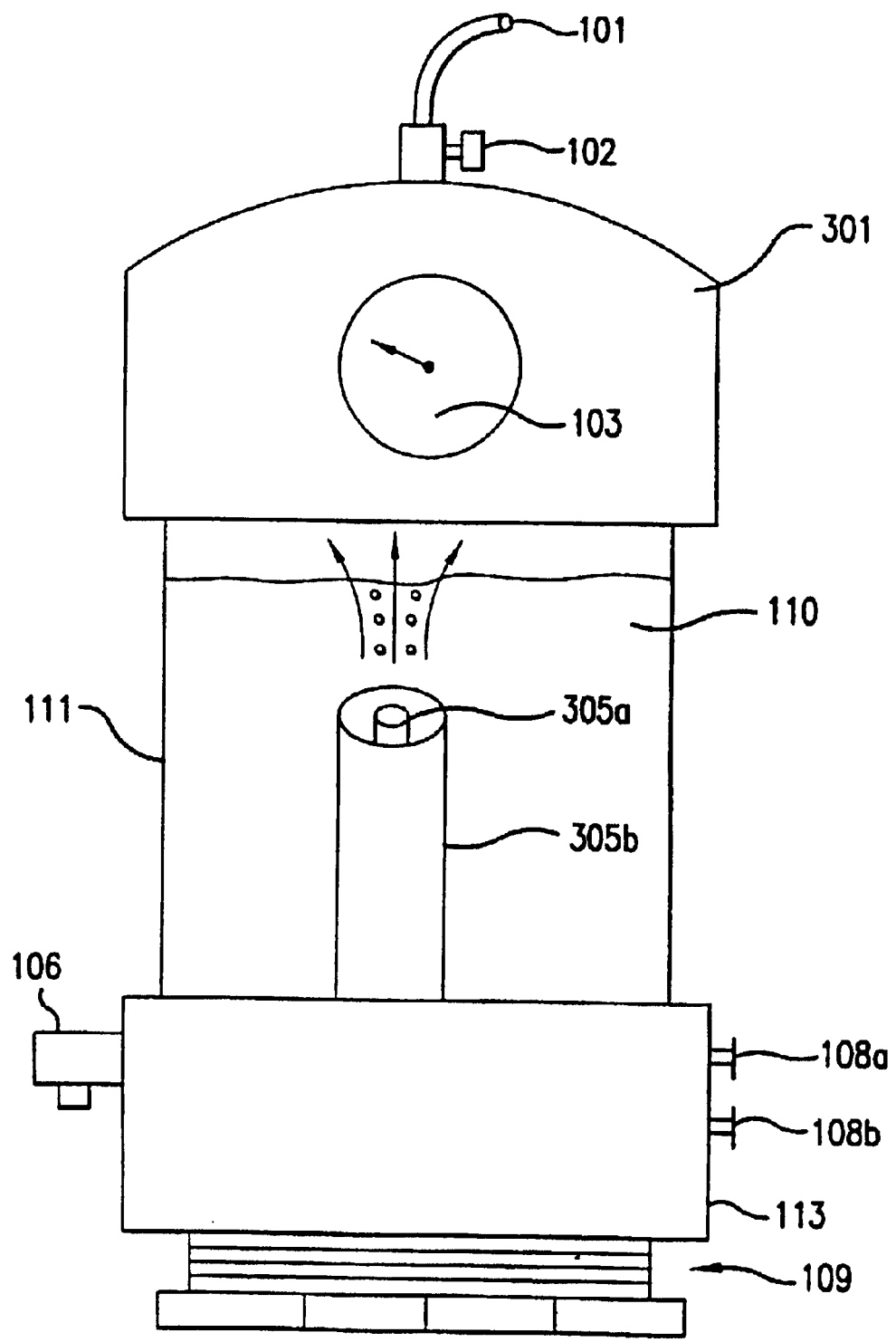
FIG. 3 is a side view of a cell for producing orthohydrogen including a pair of cylindrical-shaped electrodes according to a third embodiment of the present invention.

FIG. 3 illustrates a cell having cylindrically shaped electrodes 305a, 305b. The outer electrode 305b surrounds the coaxially aligned inner electrode 305a. The equal spacing of the electrodes 305a, 305b is less than 5 mm and the interactive zone is coaxially arranged between the two electrodes 305a, 305b. While FIG. 3 illustrates the top portion of the container 111 being formed by a plastic cap 301, it will be appreciated to those skilled in the art that the cap 301 may be used in the embodiments of FIGS. 1–2 and the embodiment of FIG. 3 can utilize the same container 111 illustrated in FIGS. 1–2. As suggested by FIG. 3, the electrodes can be almost any shape such as flat plates, rods, tubes or coaxial cylinders.

The electrodes 105a, 105b of FIG. 1 (or electrodes 205a–d of FIG. 2 or electrodes 305a, 305b of FIG. 3) are respectively connected to power supply terminals 108a, 108b so that they can receive a pulsed electrical signal from a power supply. The pulsed signal can be almost any waveform and have a variable current level, voltage level, frequency and mark-space ratio (i.e., a ratio of the duration of a single pulse to the interval between two successive pulses). For example, the power supply providing power to the electrodes can be a mains 110 volts to a 12 volt supply or a car battery.

Figure 4A:
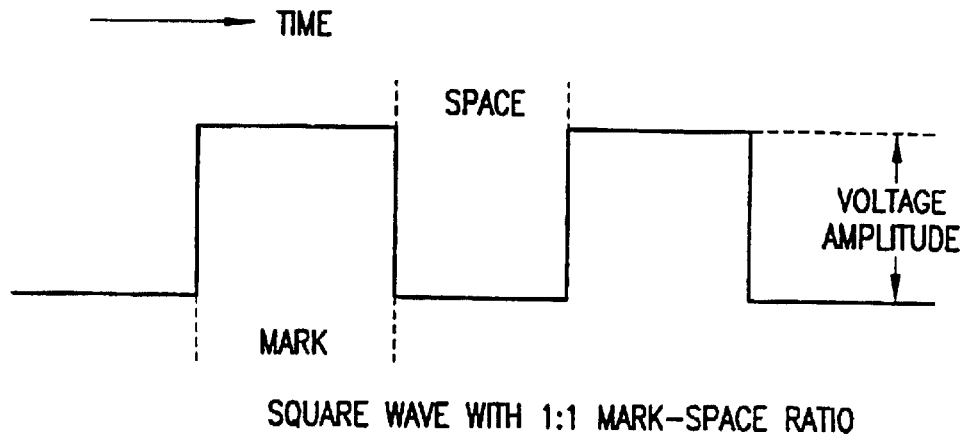
FIG. 4a is a diagram illustrating a square wave pulsed signal which can be produced by the circuit of FIG. 5 and applied to the electrodes of FIGS. 1–3.
Figure 4B:
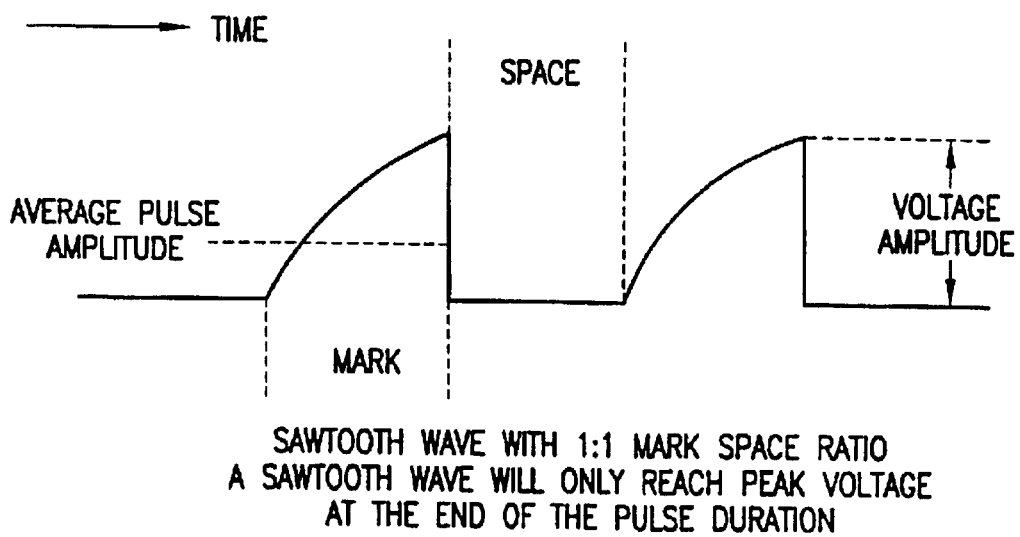
FIG. 4b is a diagram illustrating a saw tooth wave pulsed signal which can be produced by the circuit of FIG. 5 and applied to the electrodes of FIGS. 1–3.
Figure 4C:
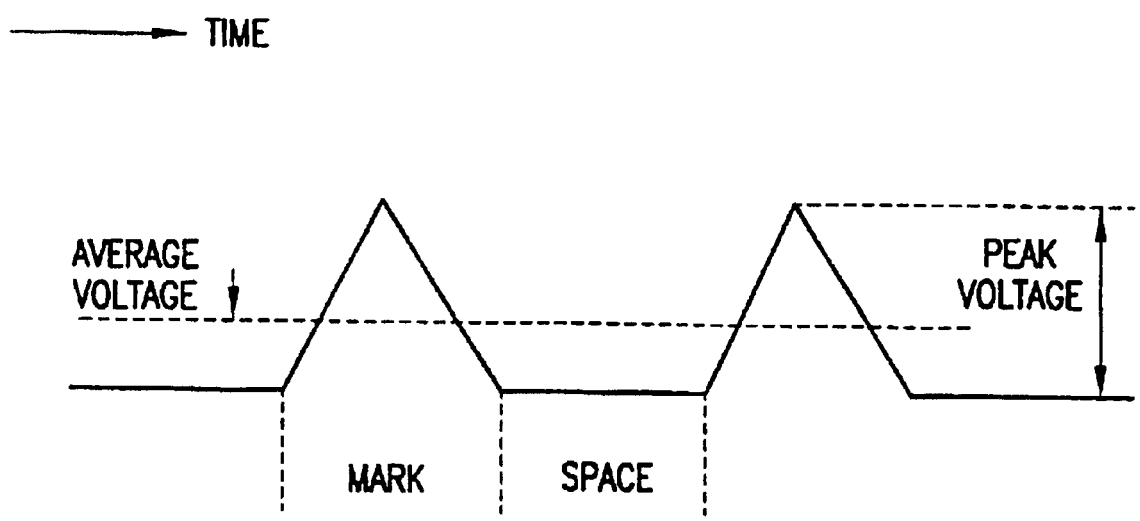
FIG. 4c is a diagram illustrating a triangular wave pulsed signal which can be produced by the circuit of FIG. 5 and applied to the electrodes of FIGS. 1–3.

FIG. 4a, FIG. 4b and FIG. 4c illustrate a square wave, a saw tooth wave and a triangular wave, respectively which can be applied to the electrodes 105a, 105b (or 205a–d or 305a, 305b) in accordance with the present invention. Each of the waveforms illustrated in FIGS. 4a–4c has a 1:1 mark-space ratio. As shown in FIG. 4b, the saw tooth wave will only reach a peak voltage at the end of the pulse duration. As shown in FIG. 4c, the triangular wave has a low peak voltage. It has been found that optimal results for producing hydrogen and oxygen in the present invention are obtained using a square wave.

After initiation of the pulsed signal from the power supply, the electrodes 105a, 105b continuously and almost instantaneously generate hydrogen and oxygen bubbles from the water 110 in the interaction zone 112. Moreover, the bubbles can be generated with only minimal heating of the water 110 or any other part of the cell. These bubbles rise through the water 110 and collect in the upper portion of the container 111.

The generated bubbles are not bunched around or on the electrodes 105a, 105b and thus readily float to the surface of the water 110. Therefore, there is no need to add a chemical catalyst to assist the conduction of the solution or reduce the bubble bunching around or on the electrodes 105a, 105b. Thus, only tap water is needed for generation of the hydrogen and oxygen in the present invention.

The gases produced within the container are self-pressurizing (i.e., pressure builds in the container by the production of gas, without an air pump). Thus, no additional pump is needed to be coupled to the container 111 and the produced gases do no need to be transported into a pressurized container.

The power supply in the present invention is required to provide a pulsed signal having only 12 volts at 300 ma (3.6 watts). It has been found that an optimal amount of hydrogen and oxygen has been produced when the pulsed signal has mark-space ratio of 10:1 and a frequency of 10–250 KHz. Using these parameters, the prototype cell of the present invention is capable of producing gas at the rate of 1 p.s.i. per minute. Accordingly, the cell of the present invention is capable of producing hydrogen and oxygen in a highly efficient manner, quickly and with low power requirements.

As noted above, the hydrogen produced by the embodiments of FIGS. 1–3 is orthohydrogen. As is well understood by those skilled in the art, orthohydrogen is highly combustible. Therefore, any orthohydrogen produced can be transported from the container 11 through valve 102 and outlet tube 101 to be used by a device such as an internal combustion engine.

The present invention, with sufficient electrodes, can generate hydrogen and oxygen fast enough to feed the gases directly into an internal combustion engine or turbine engine, and run the engine continuously without accumulation and storage of the gases. Hence, this provides for the first time a hydrogen/oxygen driven engine that is safe because it requires no storage of hydrogen or oxygen gas.

Figure 5:
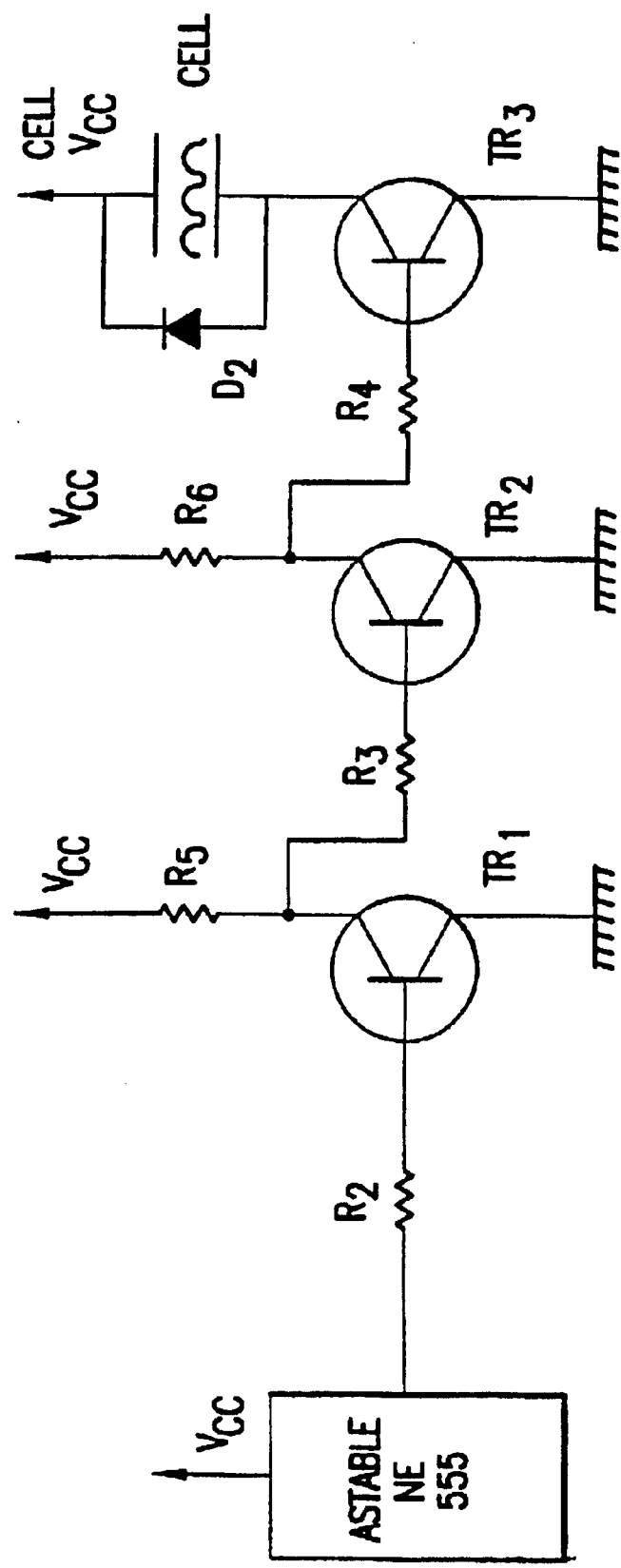
FIG. 5 is an electronic circuit diagram illustrating a power supply which is connected to the electrodes of FIGS. 1–3.

FIG. 5 illustrates an exemplary power supply for providing D.C. pulsed signals such as those illustrated in FIGS. 4a–4c to the electrodes illustrated in FIGS. 1–3. As will be readily understood by those skilled in the art, any other power supply which is capable of providing the pulsed signals discussed above can be substituted therefor.

The power supply illustrated in FIG. 5 includes the following parts and their exemplary components or values:

| Astable circuit | NE555 or equivalent logic circuit |
|---|---|
| Resistor R2 | 10K |
| Resistor R3 | 10K |
| Resistor R4 | 10K |
| Resistor R5 | 2.7K |
| Resistor R6 | 2.7K |
| Transistor TR1 | 2N3904 |
| Transistor TR2 | 2N3904 |
| Transistor TR3 | 2N3055 or any high speed, high current silicon switch |
| Diode D2 | 1N4007 |
| Capacitors (not shown) | Vcc by-pass capacitors as required. |

The astable circuit is connected to the base of transistor TR1 through resistor R2. The collector of transistor TR1 is connected to voltage supply Vcc through resistor R5 and the base of transistor TR2 through resistor R3. The collector of transistor TR2 is connected to voltage supply Vcc through resistor R6 and the base of transistor TR3 through resistor R4. The collector of transistor TR3 is connected to one of the electrodes of the cell and diode D2. The emitters of transistors TR1, TR2, TR3 are connected to ground. Resistors R5 and R6 serve as collector loads for transistors TR1 and TR2, respectively. The cell serves as the collector load for transistor TR3. Resistors R2, R3 and R4 serve to respectively ensure that transistors TR1, TR2 and TR3 are saturated. The diode D2 protects the rest of the circuit from any induced back emf within the cell.

The astable circuit is used to generate a pulse train at a specific time and with a specific mark-space ratio. This pulse train is provided to the base of transistor TR1 through resistor R2. Transistor TR1 operates as an invert switch. Thus, when the astable circuit produces an output pulse, the base voltage of the transistor TR1 goes high (i.e., close to Vcc or logic 1). Hence, the voltage level of the collector of transistor TR1 goes low (i.e., close to ground or logic 0).

Transistor TR2 also operates as an inverter. When the collector voltage of transistor TR1 goes low, the base voltage of transistor TR2 also goes low and transistor TR2 turns off. Hence, the collector voltage of transistor TR2 and the base voltage of Transistor TR3 go high. Therefore, the transistor TR3 turns on in accordance with the mark-space ratio set forth by the astable circuit. When the transistor TR3 is on, one electrode of the cell is connected to Vcc and the other is connected to ground through transistor TR3. Thus, the transistor TR3 can be turned on (and off) and therefore the transistor TR3 effectively serves as a power switch for the electrodes of the cell.

Figure 6:
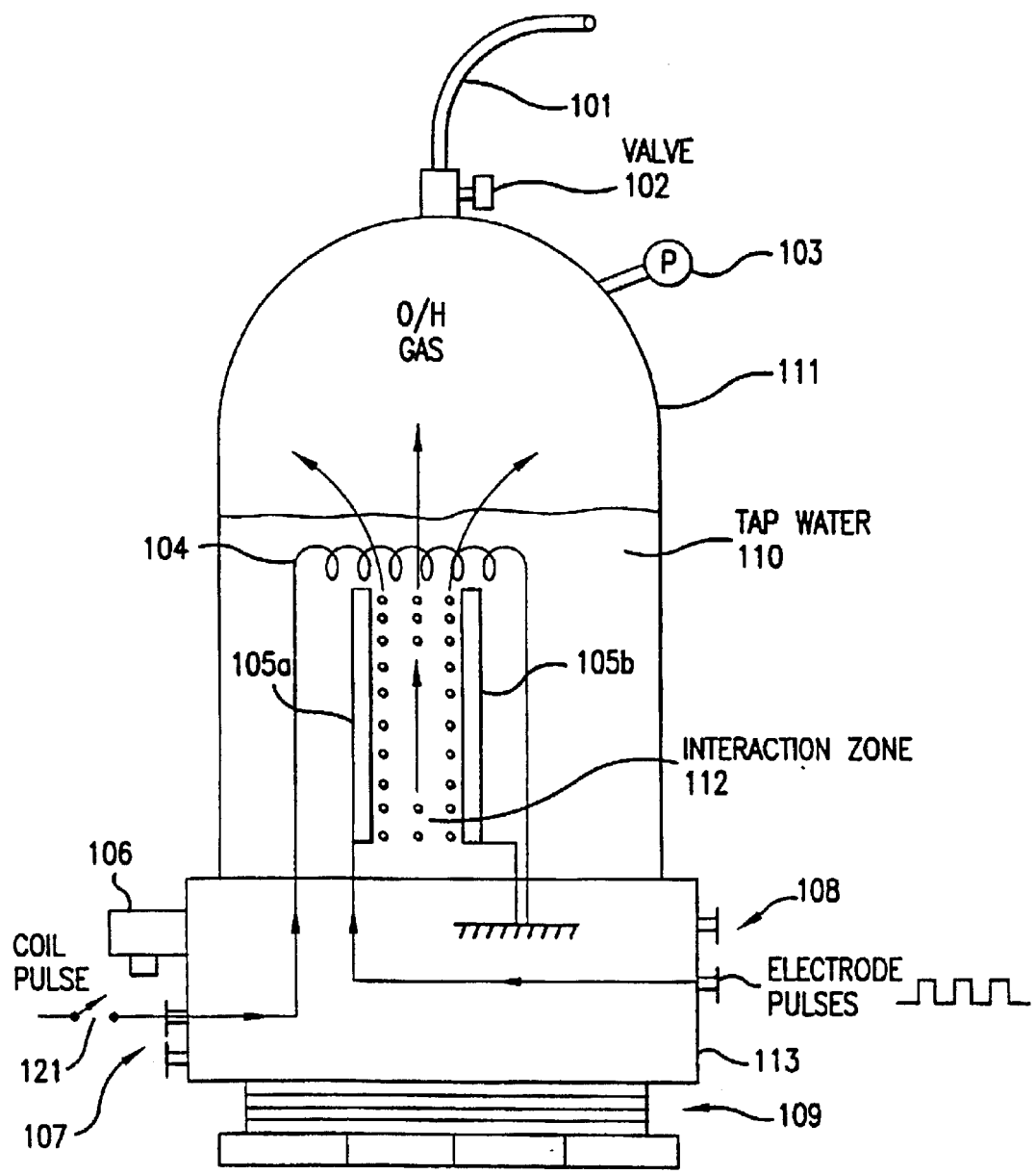
FIG. 6 is a side view of a cell for producing at least parahydrogen including a coil and a pair of electrodes according to a fourth embodiment of the present invention.
Figure 7:
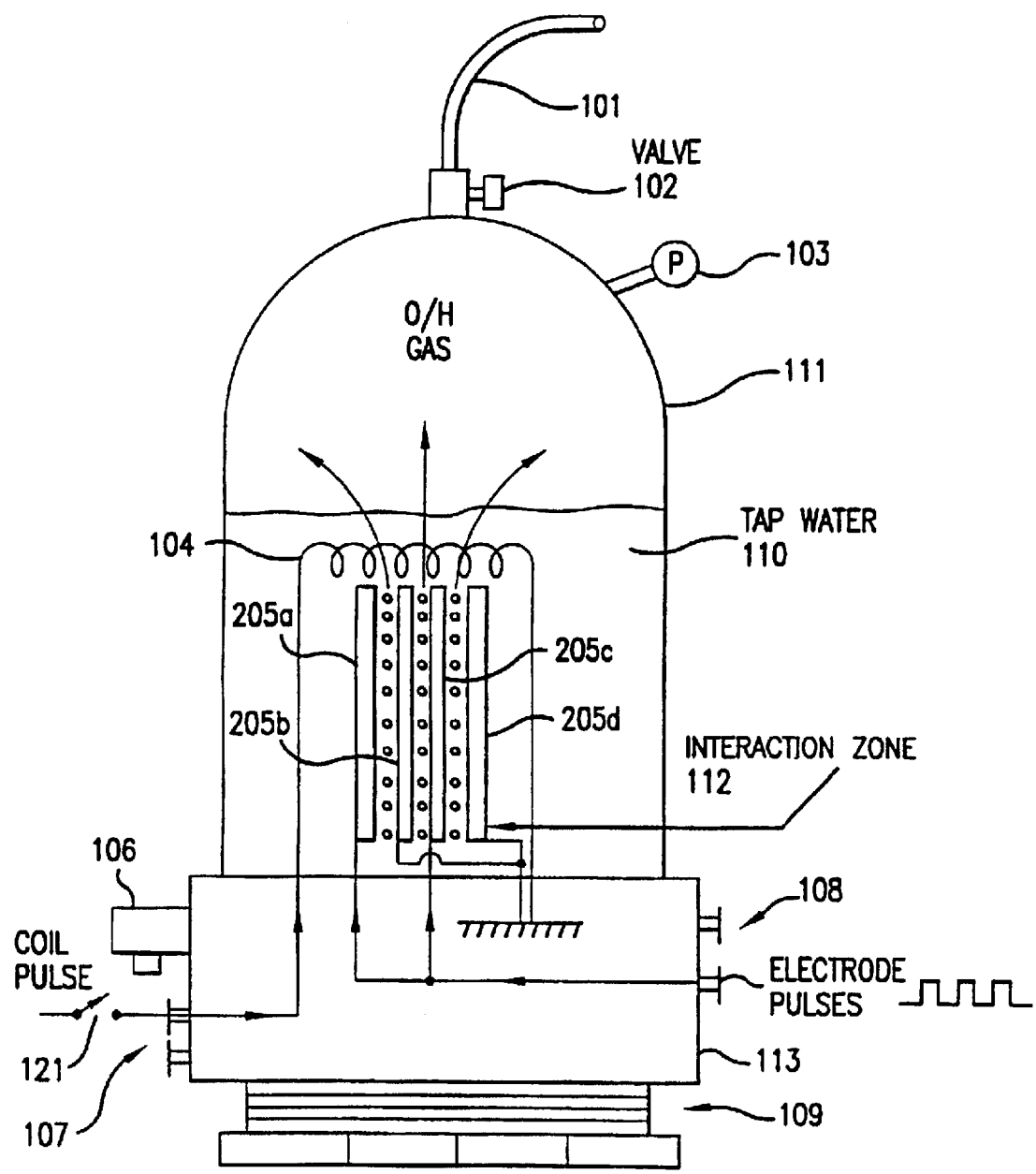
FIG. 7 is a side view of a cell for producing at least parahydrogen including a coil and two pairs of electrodes according to a fifth embodiment of the present invention.
Figure 8:
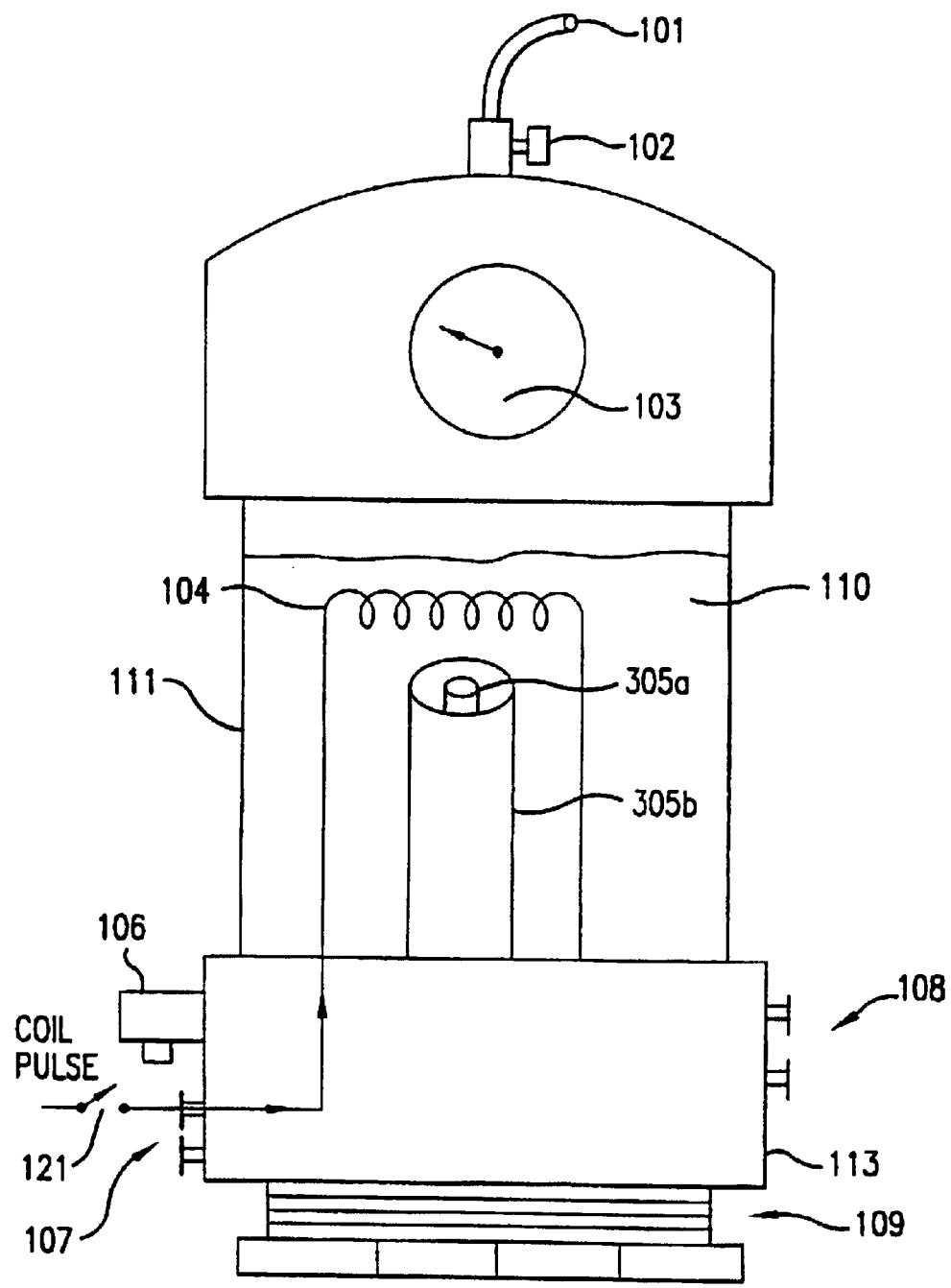
FIG. 8 is a side view of a cell for producing at least parahydrogen including a coil and a pair of cylindrical-shaped electrodes according to a sixth embodiment of the present invention.

FIGS. 6–8 illustrate additional embodiments of the cell which are similar to the embodiments of FIGS. 1–3, respectively. However, each of embodiments of FIGS. 6–8 further includes a coil 104 arranged above the electrodes and power supply terminals 107 connected to the coil 104. The dimensions of the coil 104 can be, for example, 5×7 cm and have, for example, 1500 turns. The coil 104 is submerged under the surface of the water 110.

The embodiments of FIGS. 6–8 further include an optional switch 121 which can be switched on or off by the user. When the switch 121 is not closed, then the cell forms basically the same structure as FIGS. 1–3 and thus can be operated in the same manner described in FIGS. 1–3 to produce orthohydrogen and oxygen. When the switch 121 is closed, the additional coil 104 makes the cell capable of producing oxygen and either (1) parahydrogen or (2) a mixture of parahydrogen and orthohydrogen.

When the switch 121 is closed (or not included), the coil 104 is connected through terminals 106 and the switch 121 (or directly connected only through terminals 106) to a power supply so that the coil 104 can receive a pulsed signal. As will be discussed below, this power supply can be formed by the circuit illustrated in FIG. 9.

When the coil 104 and the electrodes 105a, 105b receive pulses, it is possible to produce bubbles of parahydrogen or a mixture of parahydrogen and orthohydrogen. The bubbles are formed and float to the surface of the water 110 as discussed in FIGS. 1–3. When the coil is pulsed with a higher current, a greater amount of parahydrogen is produced. Moreover, by varying the voltage of the coil 104, a greater/lesser percentage of orthohydrogen/parahydrogen can be produced. Thus, by controlling the voltage level, current level and frequency (discussed below) provided to the coil 104 (and the parameters such as voltage level, current level, frequency, mark-space ratio and waveform provided to the electrodes 105a, 105b as discussed above) the composition of the gas produced by the cell can be controlled. For example, it is possible to produce only oxygen and orthohydrogen by simply disconnecting the coil 104. It is also possible to produce only oxygen and parahydrogen by providing the appropriate pulsed signals to the coil 104 and the electrodes 105a, 105b. All of the benefits and results discussed in connection with the embodiments of FIGS. 1–3 are equally derived from the embodiments of FIGS. 6–8. For example, the cells of FIGS. 6–8 are self-pressurizing, require no-chemical catalyst, do not greatly heat the water 110 or cell, and produce a large amount of hydrogen and oxygen gases from a modest amount of input power, without bubbles on the electrodes.

A considerable amount of time must pass before the next pulse provides current to the coil 104. Hence, the frequency of the pulsed signal is much lower than that provided to the electrodes 105a, 105b. Accordingly, with the type of coil 104 having the dimensions described above, the frequency of pulsed signals can be as high as 30 Hz, but is preferably 17–22 Hz to obtain optimal results.

Parahydrogen is not as highly combustible as orthohydrogen and hence is a slower burning form of hydrogen. Thus, if parahydrogen is produced by the cell, the parahydrogen can be coupled to a suitable device such as a cooker or a furnace to provide a source of power or heat with a slower flame.

Figure 9:
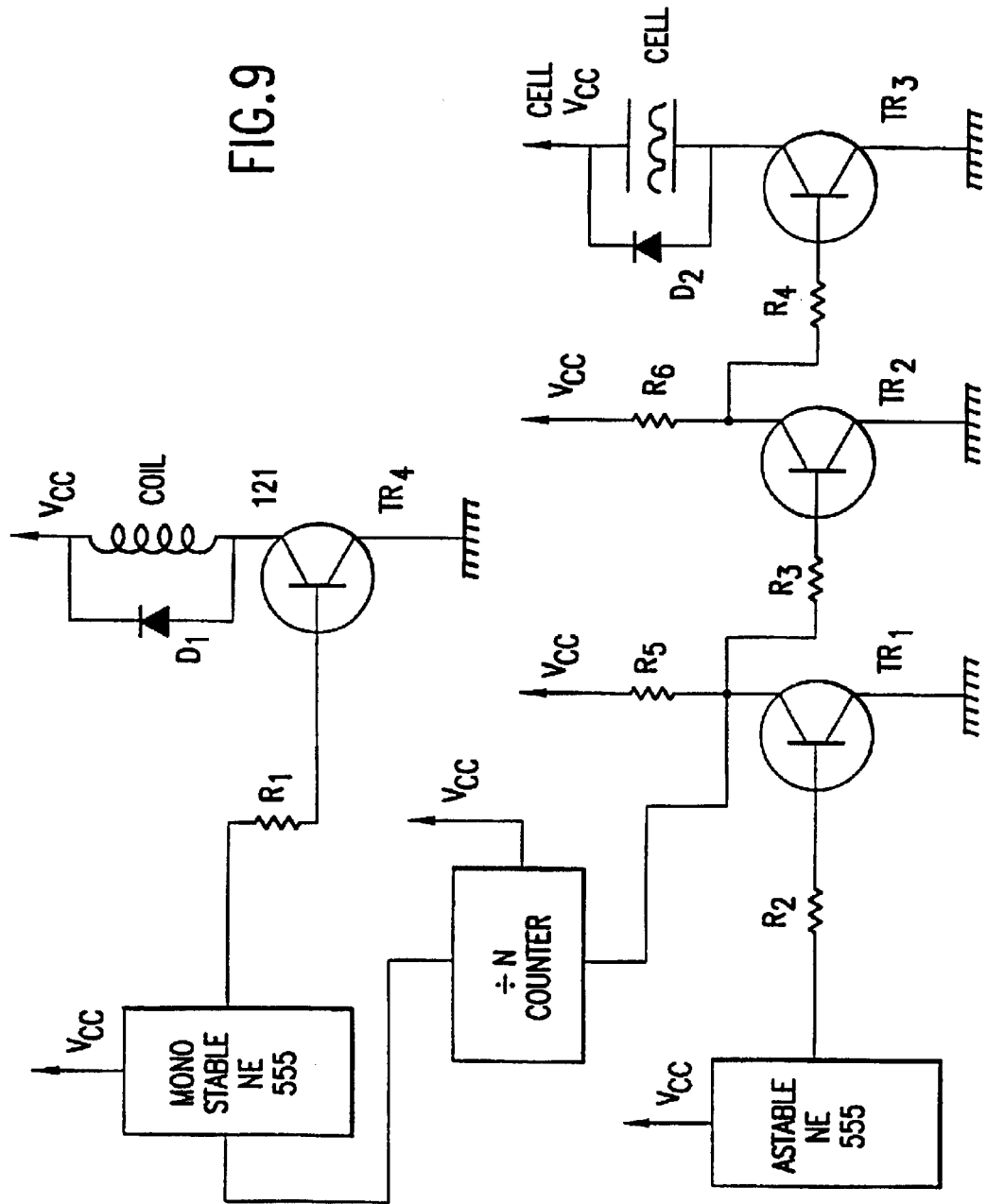
FIG. 9 is an electronic circuit diagram illustrating a power supply which is connected to the coil and electrodes of FIGS. 6–8.

FIG. 9 illustrates an exemplary power supply for providing D.C. pulsed signals such as those illustrated in FIGS. 4a–4c to the electrodes illustrated in FIGS. 6–8. Additionally, the power supply can provide another pulsed signal to the coil. As will be readily understood by those skilled in the art, any other power supply which is capable of providing the pulsed signals discussed above to the electrodes of the cell and the coil can be substituted therefor. Alternatively, the pulsed signals provided to the electrodes and the coil can be provided by two separate power supplies.

The portion of the power supply (astable circuit, R2–R6, TR1–TR3, D2) providing a pulsed signal to the electrodes of the cell is identical to that illustrated in FIG. 5. The power supply illustrated in FIG. 9 further includes the following parts and their respective exemplary values:

| | |
|---|---|
| Divide by N counter | 4018 BPC or equivalent logic circuit |
| Monostable circuit | NE 554 or equivalent logic circuit |
| Resistor R1 | 10K |
| Transistor TR4 | 2N3055 or any high speed high current silicon switch |
| Diode D1 | 1N4007. |

The input of the divide by N counter (hereinafter "the divider") is connected to the collector of transistor TR1. The output of the divider is connected to the monostable circuit and the output of the monostable circuit is connected to the base of transistor TR4 through resistor R1. The collector of the transistor TR4 is connected to one end of the coil and a diode D1. The other end of the coil and the diode D1 is connected to the voltage supply Vcc. The resistor R1 ensures that TR4 is fully saturated. The diode D2 prevents any induced back emf generated within the coil from damaging the rest of the circuit. As illustrated in FIGS. 6–8, a switch 121 can also be incorporated into the circuit to allow the user to switch between (1) a cell which produces orthohydrogen and oxygen, and (2) a cell which produces at least parahydrogen and oygen.

The high/low switching of the collector voltage of the transistor TR1 provides a pulsed signal to the divider. The divider divides this pulsed signal by N (where N is a positive integer) to produce a pulsed output signal. This output signal is used to trigger the monostable circuit. The monostable circuit restores the pulse length so that it has a suitable timing. The output signal from the monostable circuit is provided to the base of the transistor TR4 through resistor R1 to switch the transistor TR4 on/off. When the transistor TR4 is switched on, the coil is placed between Vcc and ground. When the transistor TR4 is switched off, the coil is disconnected from the rest of the circuit. As discussed in conjunction with FIGS. 6–8, the frequency of pulse signal provided to the coil is switched at a rate preferably between 17–22 Hz; i.e., much lower than the frequency of the pulsed signal provided to the electrodes.

As indicated above, it is not required that the circuit (divider, monostable circuit, R1, TR4 and D1) providing the pulsed signal to the coil be connected to the circuit (astable circuit, R2–R6, TR1–TR3, D2) providing the pulsed signal to the electrodes. However, connecting the circuits in this manner will provide an easy way to initiate the pulsed signal to the coil.

A working prototype of the present invention has been successfully built and operated with the exemplary and optimal parameters indicated above to generate orthohydrogen, parahydrogen and oxygen from water. The output gas from the prototype has been connected by a tube to the manifold inlet of a small one cylinder gasoline engine, with the carburetor removed, and has thus successfully run such engine without any gasoline.

It will be obvious to those having skill in the art that many changes may be made to the details of the above-described embodiment of this invention without departing from the underlying principles thereof. The scope of the present invention should, therefore, be determined only by the following claims.

What is claimed is:

1. An apparatus, comprising:
   a container for holding a fluid including water;
   a pair of electrodes arranged within the container, the electrodes being spaced apart from each other by 5 mm or less;
   a power supply coupled to the electrodes for providing a pulsed electrical signal to one of the electrodes, the pulsed electrical signal having a frequency from 10 to 250 kHz; and
   wherein the electrodes are adapted for submersion in the fluid.

2. The apparatus of claim 1 in which the pulsed electrical signal has a voltage of 12 volts and a current of 300 ma.

3. The apparatus of claim 1 in which the pulsed electrical signal has a mark-space ratio between approximately 1:1 and approximately 10:1.

4. The apparatus of claim 1 in which the pulsed electrical signal has a square-wave waveform.

5. The apparatus of claim 1 in which the electrodes include a pair of flat plates.

6. The apparatus of claim 5, further comprising at least one additional pair of electrodes coupled to the power supply, wherein each electrode of the additional pair of electrodes forms a flat plate.

7. The apparatus of claim 5 in which the electrodes are both formed of the same material.

8. The apparatus of claim 7 in which the material forming the electrodes is stainless steel.

9. The apparatus of claim 1 in which the apparatus is adapted to produce hydrogen and oxygen from the fluid in the absence of a chemical catalyst.

10. The apparatus of claim 1 in which the container includes a pressure relief valve that opens when the pressure within the container exceeds a predetermined threshold.

11. The apparatus of claim 1 in which the apparatus is adapted to produce hydrogen and oxygen from the fluid in response to the pulsed electrical signal, and the container includes an output port for outputting the hydrogen and, oxygen, and further comprising:
    a device including an input port connected to the output port for receiving the hydrogen and oxygen, the device selected from the group consisting of:
    a. an internal combustion engine;
    b. a reciprocating piston engine;
    c. a gas turbine engine;
    d. a stove;
    e. a heater;
    f. a furnace;
    g. a distillation unit;
    h. a water purification unit; and
    i. a hydrogen/oxygen flame jet.

12. The apparatus of claim 1 in which one of the pair of electrodes forms an inner cylinder and the other of the pair of electrodes forms an outer cylinder surrounding the inner cylinder.

13. The apparatus of claim 12 in which the electrodes are both formed of the same material.

14. The apparatus of claim 13 in which the material forming the electrodes is stainless steel.

15. The apparatus of claim 1 in which the frequency of the pulsed electrical signal is variable.

16. The apparatus of claim 1, further comprising:
    a coil arranged within the container; and
    a second power supply coupled to the coil for applying a second electrical signal to the coil.

* * * * *